United States Patent
Schütz et al.

(10) Patent No.: US 12,496,754 B2
(45) Date of Patent: Dec. 16, 2025

(54) SYSTEM FOR PRODUCING AT LEAST ONE PARTICLE FOAM MOULDING

(71) Applicant: Siegfried Hofmann GmbH, Lichtenfels (DE)

(72) Inventors: Johannes Schütz, Bamberg (DE); Patrick Fischer, Ebersdorf (DE); Stefan Mahr, Hochstadt (DE); Peter Körber, Kulmbach (DE); Kai Faulhaber, Bad Staffelstein (DE); Edin Pachadjioski, Lichtenfels (DE)

(73) Assignee: Siegfried Hofmann GmbH, Lichtenfels (DE)

( * ) Notice: Subject to any disclaimer, the term of this patent is extended or adjusted under 35 U.S.C. 154(b) by 167 days.

(21) Appl. No.: 18/023,090

(22) PCT Filed: Sep. 7, 2021

(86) PCT No.: PCT/EP2021/074595
§ 371 (c)(1),
(2) Date: Feb. 24, 2023

(87) PCT Pub. No.: WO2022/053460
PCT Pub. Date: Mar. 17, 2022

(65) Prior Publication Data
US 2024/0025092 A1    Jan. 25, 2024

(30) Foreign Application Priority Data

Sep. 8, 2020  (DE) ............ 10 2020 123 440.6

(51) Int. Cl.
*B29C 44/44* (2006.01)
*B29C 44/60* (2006.01)

(52) U.S. Cl.
CPC ............ *B29C 44/445* (2013.01); *B29C 44/60* (2013.01)

(58) Field of Classification Search
None
See application file for complete search history.

(56) References Cited

FOREIGN PATENT DOCUMENTS

| | | |
|---|---|---|
| DE | 3243632 | 5/1984 |
| DE | 3316926 | 11/1984 |
| JP | 2000158472 | 6/2000 |
| JP | 2008179064 | 8/2008 |
| WO | WO-2016 054 675 A1 * | 4/2016 |
| WO | WO 2016/054675 | 4/2016 |
| WO | WO-2018 100 154 A2 * | 6/2018 |
| WO | WO 2018/100154 | 6/2018 |

OTHER PUBLICATIONS

International Search Report (w/ English translation), mailed Jan. 4, 2022, and Written Opinion for corresponding PCT Application No. PCT/EP2021/074595, 13 pages.

* cited by examiner

*Primary Examiner* — Mohammad M Ameen
(74) *Attorney, Agent, or Firm* — Dority & Manning, P.A.

(57) ABSTRACT

System for producing at least one particle foam molding from an expandable or expanded particle foam material, comprising: —a detection device which is configured to detect at least one item of resource information describing the current and/or future consumption of at least one resource, in particular a process fluid or an energy carrier, in a current and/or future operation of a molding machine and/or of a functional module, —a control device which is configured to control the operation of the molding machine and/or of the functional module on the basis of an item of resource information.

14 Claims, 2 Drawing Sheets

SYSTEM FOR PRODUCING AT LEAST ONE PARTICLE FOAM MOULDING

The present application is a US national phase entry of International Patent Application No. PCT/EP2021/074595, filed Sep. 7, 2021, which, in turn, claims the right of priority to German Patent Application No. DE 10 2020 123 440.6, filed Sep. 8, 2020, the disclosures of both of which are hereby incorporated by reference herein in their entirety for all purposes.

The invention relates to a system for producing at least one particle foam molding from an expandable or expanded particle foam material.

Corresponding systems are basically known from the prior art in the field of processing expandable or expanded particle foam materials for the production of particle foam moldings.

Typical components of such systems are molding machines, which comprise at least one mold device for processing expandable or expanded particle foam material for the production of a particle foam component.

Corresponding molding machines are typically assigned functional modules such as steam generators, which have certain functions in connection with the processing of expandable or expanded particle foam materials that can be carried out by the respective automatic molding machines.

The configuration of corresponding systems, in particular the functional coupling between the respective automatic molding machines and/or the respective functional modules has typically not been implemented with regard to an optimized management of resources, such as energy carriers required for the processing of expandable or expanded particle foam material, process fluids, etc., so that during the operation of corresponding systems situations can arise in which, for example, by a simultaneous consumption of resources by several automatic molding machines, high peak loads may occur.

This represents a situation in need of improvement with regard to the efficient use of resources in a corresponding system.

Against this background, the invention is based on the object of providing a system for the production of at least one particle foam molding which is improved in comparison thereto, in particular with regard to the possibility of efficient use of resources.

The object is achieved by a system for producing at least one particle foam molding from an expandable or expanded particle foam material according to claim 1. The dependent claims relate to possible embodiments of the system.

A first aspect of the invention relates to a system for producing at least one particle foam molding, which may also be referred to as particle foam molded part, from an expandable or expanded particle foam material. The system is therefore configured for the processing of expandable or expanded particle foam material for the production of particle foam moldings and includes—as follows—for this purpose devices for the respective implementation of one or more work processes for processing plastic particles from at least one particle foam material, such as expandable or expanded polystyrene, expandable or expanded polyolefins, etc., for the production of a particle foam molding.

The term "work process" basically includes any process that can be carried out by means of the system, which is directly or indirectly related to the processing of plastic particles from at least one expandable or expanded particle foam material for the production of a particle foam molding. A work process can therefore e.g. be a manufacturing process in which the (actual) processing of corresponding plastic particles, in particular, corresponding plastic particles are connected to form a particle foam molding to be produced. Alternatively or additionally, a work process can be a provision process in which e.g. a quantity of corresponding plastic particles, in particular a quantity of corresponding plastic particles to be processed in a processing step, and/or a quantity of a process fluid, in particular a quantity of a process fluid to be processed in a processing step, is provided. Alternatively or additionally, a work process can be a provision process in which e.g. a quantity of corresponding plastic particles, in particular a quantity of corresponding plastic particles to be processed in a processing operation, and/or a quantity of a process fluid, in particular a quantity of a process fluid to be processed in a processing operation, is conveyed along a conveying path. Alternatively or additionally, a work process can e.g. be a filling process in which e.g. a quantity of corresponding plastic particles, in particular a quantity of corresponding plastic particles to be processed in a processing operation, is filled into a mold cavity of a mold device of a molding machine. Alternatively or additionally, a work process can e.g. be a treatment process in which e.g. a process fluid such as steam, compressed air, water, etc., is treated, which in particular is used in a processing step.

The system comprises at least one first automatic molding machine and at least one further automatic molding machine and/or at least one functional module that can be assigned or is assigned to the at least one first automatic molding machine and/or the at least one further automatic molding machine.

The at least one first molding machine is configured to carry out one or more processing steps for processing plastic particles from at least one particle foam material to produce a particle foam molding. The at least one first molding machine can therefore also be referred to or considered as a device for processing plastic particles from at least one expandable or expanded particle foam material. The at least one first automatic molding machine typically includes at least one mold device for, optionally steam-based, processing of plastic particles from at least one expandable or expanded particle foam material to produce a particle foam molding.

The at least one mold device typically comprises at least one mold cavity that can be defined or defined by one or more mold elements, within which plastic particles of at least one expandable or expanded particle foam material can be processed to form corresponding particle foam moldings. The at least one molding machine can have a e.g. housing-, rack- or frame-like structure, on or in which at least the at least one mold device is arranged or formed.

The at least one further automatic molding machine (if present) is also configured to carry out one or more processing steps for the optionally steam-based processing of plastic particles from at least one particle foam material to produce a particle foam molding. The at least one further automatic molding machine is typically configured analogously to the at least one first automatic molding machine, so that the above explanations in connection with the at least one first automatic molding machine apply analogously to the at least one further automatic molding machine.

The at least one first automatic molding machine—the same applies to the at least one further automatic molding machine—can have at least one interface for the particularly functional and/or constructive coupling of at least one functional module that can be assigned or is assigned to the at least one first automatic molding machine. The at least one interface can accordingly be a functional and/or a constructive interface. A corresponding interface can therefore be configured to establish a functional and/or constructive coupling of the at least one first automatic molding machines with at least one functional module that can be functionally assigned or assigned to the at least one first automatic molding machine, in particular with the formation of an individually configurable or configured automatic molding machine functional module arrangement. Respective interfaces on the molding machine side are configured in particular to interact with the respective interfaces on the functional module side. The at least one automatic molding machine-side interface enables in particular an optional direct coupling of at least one functional module; in particular, such that a molding machine-side structure or housing structure can be coupled or is coupled directly to a structure or housing structure of the respective functional module. The same applies in turn to the at least one further molding machine (if present).

As mentioned, the system may also comprise at least one functional module that can be assigned or is assigned to the at least one first automatic molding machine and/or to the at least one further automatic molding machine. The at least one functional module is configured to carry out one or more work processes for processing plastic particles from at least one particle foam material to produce a particle foam molding. Depending on its specific functionality, the at least one functional module comprises at least one functional unit which is configured to carry out one or more work processes for processing plastic particles from at least one particle foam material to produce a particle foam molding. In a corresponding work process, it can e.g. be a corresponding provision process, a corresponding conveying process, a corresponding filling process, or a corresponding preparation process. The at least one functional module can be e.g. a housing-, rack- or frame-like structure, on or in which the at least one functional unit is arranged or formed.

The at least one, or at least one functional module can be formed as a provision device for providing at least one resource, such as e.g. a process fluid or energy carrier, for the at least one first automatic molding machine and/or for the at least one further automatic molding machine and/or for at least one further functional module, or can comprise such a device. The term "provision" can include the generation or storage of a resource. A resource in the form of an energy carrier can in particular be an electrical energy carrier, such as e.g. current or voltage, and/or a pneumatic energy carrier such as pressure, and/or a thermal energy carrier, such as heat. A resource in the form of a process fluid can e.g. be steam, compressed air and/or water.

A specific embodiment of a corresponding functional module can be e.g. a provision device for providing a process fluid such as cooling water, for temperature control of at least one automatic molding machine. Another specific embodiment of a corresponding functional module can e.g. be a provision device for providing a process fluid such as steam for the connection of plastic particles from at least one expandable or expanded particle foam material located in the mold cavity of the at least one automatic molding machine and thus be associated with the formation of a respective particle foam molding. Another specific embodiment of a corresponding functional module can e.g. be a provision device for providing a pressurized gas such as compressed air, e.g. for drying the at least one mold cavity of a molding machine.

Another specific embodiment of a corresponding functional module can e.g. be a storage device for temporarily storing a resource such as a process fluid or an energy source. A specific embodiment of a corresponding functional module can e.g. be a storage device for temporarily storing a resource such as be a steam storage, a compressed air storage, a water storage as examples of storage devices for storing a process fluid or an electricity storage, a pressure storage, a heat storage as examples of storage devices for storing an energy carrier.

Alternatively or additionally, the at least one functional module or at least one functional module can be configured as a provision device for providing an expandable or expanded particle foam material or corresponding plastic particles that can be processed or can be processed via at least one molding machine. A specific embodiment of a corresponding functional module can e.g. be a conveying device for conveying an expandable or expanded particle foam material or corresponding plastic particles that can be processed or is to be processed via at least one molding machine into at least one mold cavity of at least one molding machine.

Alternatively or in addition, the at least one functional module or at least one functional module can be configured as or comprise a processing device for processing a process fluid of at least one molding machine and/or at least one further functional module. The term "treatment" can include the change in at least one chemical and/or physical parameter of the respective process fluid.

The at least one functional module can comprise at least one interface for in particular functional and/or constructive coupling to the at least one first automatic molding machine and/or the at least one further automatic molding machine. The at least one interface can accordingly be a functional and/or constructive interface. A corresponding interface can therefore be configured to produce a functional and/or constructive coupling of the at least one functional module with at least one automatic molding machine, in particular with the formation of an individually configured automatic molding machine/functional module arrangement. The respective functional module-side interfaces are configured in particular to interact with the respective automatic molding machine-side interfaces. The at least one functional module-side interface enables in particular a direct coupling of at least one molding machine; in particular such that a functional module-side structure or housing structure can be coupled or is coupled directly to a structure or housing structure of the respective automatic molding machine.

Of course, it is conceivable that several automatic molding machines are or will be coupled to one another via corresponding automatic molding machine interfaces. It is equally conceivable that several functional modules can be or are coupled to one another via corresponding functional module-side interfaces. It is also conceivable that a plurality of automatic molding machines that are coupled to one another are coupled to a plurality of functional modules that are coupled to one another.

In principle, the system can therefore have several automatic molding machines of the same or different configuration and/or several functional modules of the same or different configuration, i.e. in particular having the same or different functionality. In this case, respective molding machines and/or respective functional modules can e.g. be arranged in parallel and/or serial arrangement.

Resources are typically consumed as part of the operation of the system. A corresponding resource can e.g. be a process fluid, in particular steam and/or compressed air and/or water, and/or an energy source required to operate the first molding machine and/or the at least one further molding machine and/or the at least one functional module, in particular an electrical, pneumatic and/or or thermal energy carrier.

The system also includes at least one detection device implemented in terms of hardware and/or software. The detection device is used to detect the current and/or future consumption of at least one resource, i.e. resource information describing in particular a process fluid or an energy carrier, in a current and/or future operation of the first molding machine and/or the at least one further molding machine and/or the at least one functional module. An indication or knowledge in the form of a corresponding item of resource information can be generated by means of the detection device about the current or future consumption of one or more resources consumed during the operation of the system or a component of the system, i.e. of the at least one first automatic molding machine and/or the at least one further automatic molding machine and/or the at least one functional module.

The detection device can therefore comprise one or more detection elements arranged or distributed within the system, i.e. e.g. sensor elements, consumption meter elements, etc., the detection information of which can be processed by the detection device, i.e. in particular corresponding processing algorithms of the detection device, into a corresponding resource information. For example, the components of the system can each be assigned at least one corresponding detection element, via which detection information describing a current and/or future consumption of one or more resources required for the operation of the respective component or one or more resources within the scope of the operation of the respective consumed resource component (s) (consumption detection information) can be generated, on the basis of which the detection device generates the resource information.

In order to generate corresponding resource information, the detection device can generally process any information—this can, as mentioned, e.g. be provided from the at least one automatic molding machine and/or the at least one further automatic molding machine and/or the at least one functional module that can be assigned or is assigned to the detection element—via which the consumption of one or more resources in a current and/or future operation of the system can be described. In principle, e.g. current consumption values of one, several or all resources used in the operation of the system and/or, e.g. from an operational plan of the system, future consumption values of one, several or all resources consumed during operation of the system are taken into account and processed accordingly to form resource information.

The detection device can be configured to generate specific resource information for certain resources, i.e. resource information describing the current and/or future consumption of one or more specific resources. Specific resource information can e.g. be generated for certain process fluids and/or certain energy carriers. A specific example is therefore resource information which describes the current and/or future consumption of steam or compressed air or water as respective examples of specific process fluids. A further specific example is resource information which describes the current and/or future consumption of electrical, pneumatic or thermal energy as respective examples of specific energy carriers.

Alternatively, the detection device can be configured to generate specific resource information for certain components of the system, i.e. resource information describing the current and/or future consumption of one or more specific components of the system. Specific resource information can e.g. be generated for certain molding machines and/or certain functional modules. A specific example is therefore resource information which describes the current and/or future consumption of a resource for at least one specific molding machine or a group of specific molding machines, in particular a group of molding machines configured in the same or similar manner. A further specific example is resource information which describes the current and/or future consumption of a resource for at least one specific functional module or a group of specific functional modules, in particular a group of functional modules configured in the same or similar manner.

Of course, resource information can also describe both specific resource information for specific resources and specific resource information for specific components of the system. Consequently, very detailed information about the current and/or future resource consumption or resource requirements within the system can be described via a corresponding resource information.

In principle, the term "resource consumption" can also include a resource requirement or the term "resource consumption" can also be understood as the term "resource requirement".

Corresponding resource information can therefore be used to obtain qualitative or quantitative knowledge, optionally resolved in terms of location and/or time, about the current and/or future consumption of one or more resources required for the operation of the system or resources consumed within the scope of the operation of the system, which, as follows, can be used as a basis for the control of the operation of the system, for example with regard to the most efficient possible use of corresponding resources.

Consequently, a certain resource consumption of the system or individual functional modules of the system can be discussed preventively via corresponding resource information, which enables efficient control of the system, e.g. with regard to the mentioned use of corresponding resources, but also, for example, with regard to reducing dead times of certain functional modules.

For example, a current or future resource consumption within the system that is required for the operation of at least one first molding machine and/or at least one first functional module can be transmitted to at least one further molding machine and/or to at least one further functional module, so that the resource required for the operation of the at least one first molding machine and/or the at least one first functional module can be made available in good time via the at least one further molding machine and/or via the at least one further functional module.

In other words, corresponding resource information can be used to preventively determine information about an increase or decrease in demand for at least one specific resource within the system and use it as a basis for controlling the system or individual, several or all components of the system.

Corresponding resource information can be generated continuously, quasi-continuously or discontinuously. The detection device can therefore be configured to generate corresponding resource information continuously, quasi-continuously or discontinuously.

Furthermore, the system comprises at least one control device implemented in terms of hardware and/or software. The control device—which can be a central control station of the system—is used to control the operation of the system, i.e. in particular the first molding machine and/or the at least one further molding machine (if present) and/or the at least one functional module, configured on the basis of corresponding resource information. Controlling the operation of the system can also influence the consumption of one, several or all of the resources used in current and/or future operation of the system. In this way, optimized operation of the system can be realized e.g. with regard to a target criterion explained in more detail below, such as the consumption of resources.

The control device communicating with the components of the system via data connections can, in the sense of a hub, use current consumption values, etc. of individual, several or all components of the system as a basis for an optimized control of the operation of the system. Appropriate control of the operation of the system can of course also have a positive effect on the quality of the particle foam moldings that can be produced or have been produced by means of the system, and their reproducibility.

Through the interaction of the detection device and the control device and thus through the possibility of the specific control of the operation of the system based on appropriate resource information, i.e. in particular, controlling the operation of the system or specific components of the system as a function of corresponding resource information, provision is made for a possibility of controlling the operation of the system with regard to the efficient use of resources. This also includes the possibility of controlling and, if required, optimizing the consumption of resources, particle foam materials, etc. with regard to a current and/or future operating situation of the system or individual, several or all components of the system, and/or compensating functional failures or limitations of certain components of the system.

Overall, there is thus an improved system for producing at least one particle foam molding. The detection device can also be configured to detect, as an alternative or in addition to corresponding resource information, current and/or future operating information on individual, multiple or all components of the system and to generate operating information describing the current and/or future operation of individual, several or all components of the system. Current and/or future processing processes of the respective components of the system can be detected via corresponding operating information.

The detection device can also be configured to detect, as an alternative or in addition to corresponding resource information, current and/or future status information of individual, several or all components of the system and to generate status information describing the current and/or future status of individual, several or all components of the system. Current and/or future service or repair work to be carried out on the respective components of the system or associated functional units such as molds can be detected in the sense of "predictive maintenance".

The control device can be configured to process resource information using means of artificial intelligence or machine learning in order to implement a self-optimizing system. In this way, a proactive "behavior" of the system can e.g. be realized as part of planning the operation of the system.

As indicated, the control device can be configured to base the control of the operation of the first molding machine and/or the at least one further molding machine (if present) and/or the at least one functional module on at least one target criterion. The control device can therefore be configured to control the operation of the system on the basis of corresponding resource information, but taking into account at least one target criterion. A corresponding target criterion can e.g. be on the part of the operator of the system or, where appropriate, be automated or defined by a device implemented in terms of hardware and/or software. A corresponding device can include means of artificial intelligence and/or machine learning, possibly correspondingly "trained".

A corresponding target criterion can e.g. define a certain energy consumption, in particular a minimum or a maximum energy consumption, of the system or at least a certain part of the system. The control device can therefore be configured to control the operation of the system or at least one specific component of the system on the basis of corresponding resource information, but taking into account at least one target criterion that defines a specific energy consumption of the system or at least one specific component of the system. In this way, the energy consumption, e.g. the consumption of electrical, pneumatic or thermal energy, of the system or at least a certain part of the system, such as. a molding machine and/or a functional module can be influenced.

Alternatively or additionally, a corresponding target criterion can define a specific process fluid consumption, in particular a minimum or a maximum process fluid consumption, of the system or at least of a specific component of the system. The control device can therefore be configured to control the operation of the system or at least one specific component of the system on the basis of corresponding resource information, but taking into account at least one target criterion that defines a specific process fluid consumption of the system or at least one specific component of the system. In this way, the process fluid consumption, e.g. the consumption of steam, compressed air or water, the system or at least a certain part of the system, such as a molding machine and/or a functional module can be influenced.

Alternatively or additionally, a corresponding target criterion can define a specific efficiency, in particular a minimum or maximum efficiency, of the system or at least of a specific component of the system. The control device can therefore be configured to control the operation of the system or at least one specific component of the system on the basis of corresponding resource information, but taking into account at least one target criterion defining a specific efficiency of the system or at least one specific component of the system. In this way, the efficiency of the system or at least a certain component of the system, such as e.g. of a molding machine and/or a functional module can be influenced. The efficiency of the system can in particular affect a relative consideration of the particle foam moldings that can be produced by means of the system with regard to a reference value, such as e.g. the resource consumption of the system.

Alternatively or additionally, a corresponding target criterion can define a specific productivity, in particular a minimum or maximum productivity, of the system or at least of a specific component of the system. The control device can therefore be configured to control the operation of the system or at least one specific component of the system on the basis of corresponding resource information, but taking into account at least one target criterion defining a specific productivity of the system or at least one specific component of the system. In this way, the productivity of the system or at least a certain component of the system, such as e.g. a molding machine and/or a functional module can be influenced. The productivity of the system can relate in particular to an absolute consideration of the particle foam moldings that can be produced by means of the system.

As mentioned, the control device can be configured to control the operation of at least one specific component of the system, i.e. e.g. at least one molding machine and/or at least one functional module on the basis of a corresponding resource information.

The control device can therefore be configured in particular to control at least one operating parameter, in particular power or power consumption of the at least one first molding machine and/or the at least one further molding machine (if present) and/or the at least one functional module on the basis of the resource information. Controlling at least one operating parameter of the first automatic molding machine and/or of the at least one further automatic molding machine and/or of the at least one functional module represents an expedient possibility of controlling the operation of the system with regard to a target criterion. In particular, a coordinated, i.e. in particular time-staggered, power consumption of the first automatic molding machine and/or the at least one further automatic molding machine and/or the at least one functional module is possible. In this way, peak load situations of certain components of the system or of the entire system can be coordinated in terms of control technology and thus in particular also be avoided.

Alternatively or additionally, the control device can be configured in particular to control at least one start time and/or one end time of the operation of the at least one first automatic molding machine and/or the at least one further automatic molding machine (if present) and/or the at least one functional module. Controlling a start time and/or an end time of the operation of the first automatic molding machine and/or the at least one further automatic molding machine and/or the at least one functional module also represents an expedient possibility of controlling the operation of the system with regard to a target criterion. In particular, a coordinated, i.e. in particular staggered determination of start times and/or end times of the operation of the at least one first automatic molding machine and/or the at least one further automatic molding machine and/or the at least one functional module is possible. In this way, peak load situations of certain components of the system or of the entire system can also be coordinated in terms of control technology and thus in particular also be avoided.

Alternatively or additionally, the control device can be configured to control at least one start time and/or one end time of at least one specific work process of the at least one first automatic molding machine and/or the at least one further automatic molding machine and/or the at least one functional module on the basis of the resource information. Controlling a start time and/or an end time of a work process of the first automatic molding machine and/or the at least one further automatic molding machine and/or the at least one functional module also represents an expedient possibility of controlling the operation of the system with regard to a target criterion. In particular, a coordinated, i.e. in particular staggered determination of start times and/or end times of working processes of the at least one first automatic molding machine and/or the at least one further automatic molding machine and/or the at least one functional module is possible. In this way, peak load situations of certain components of the system or of the entire system can also be coordinated in terms of control technology and thus in particular also be avoided.

The control device can also be configured to distribute, on the basis of resource information, resources, i.e. in particular process fluids, in particular preconditioned process fluids, within the system, i.e. in particular among the corresponding molding machines and/or functional modules of the system. In this way, peak consumption situations in certain components of the system can be coordinated in terms of control technology and thus, in particular, also be avoided.

In particular, the control device can be configured to base the distribution of the resources on at least one target criterion. The control device can thus be configured to control the distribution of resources such as energy carriers and/or process fluids within the system, taking into account at least one target criterion. A corresponding target criterion can e.g. be defined on the part of the operator of the system or, where appropriate, in an automated manner or by a device implemented in terms of hardware and/or software. A corresponding device may include means of artificial intelligence and/or machine learning, possibly correspondingly "trained".

A corresponding target criterion can define an even or uneven distribution of resources within the system. A corresponding even or uneven distribution of resources within the system can typically also influence the consumption of resources during operation of the system, so that a corresponding even or uneven distribution of resources within the system also results in a means of at least temporarily even or uneven consumption of resources within the system. In specific terms, situations can be avoided in which certain components of the system, e.g. in view of their given capacity, too few resources, i.e. e.g. too little process fluid, too little plastic particles, etc. and/or certain components of the system, e.g. in view of their given capacity, too many resources, i.e. e.g. too much process fluid, too much plastic particles, etc., can be avoided, so that an overall efficient distribution of resources within the system is possible.

The control device can also be configured to compare resource information with reference resource information and to generate comparison information describing a corresponding comparison result. In this case, the control device can be configured to evaluate corresponding comparative information or a corresponding comparative result with regard to at least one evaluation criterion, for example in order to identify current and/or future deviations from corresponding reference resource information. The control device can also be configured to control at least one measure for compensating for a deviation, in particular outside of a predefinable or predefined limit value, between an item of resource information and an item of reference resource information. A corresponding measure can e.g. be an active measure to change the current and/or future consumption of resources, for example through a targeted temporary decommissioning or commissioning of certain components of the system.

In all of the embodiments, the system can comprise a data transmission device, which is configured to transmit one or more items of resource information to the control device. For this purpose, the data transmission device can be configured to implement specific local or global wired or wireless data transmission protocols, such as e.g. LAN or WLAN protocols in order to transmit appropriate resource information to the control device.

The data transmission device can comprise one or more data transmission elements communicating with the control device. In particular, it is possible that at least one data transmission element can be assigned or is assigned to each component of the system, so that data from each component of the system, in particular for processing there, can be transmitted to the control device, in particular in real time.

In all of the embodiments, the system may also include at least one output device for outputting corresponding resource information. Corresponding resource information can be given to an operator of the system, e.g. in the form of an alphanumeric and/or graphical representation, via an output device, this can e.g. be configured as a display device or include such a display, so that the operator can get an overview of the current and/or future consumption of at least one resource in a current and/or future operation of the system. Of course, a corresponding output device can alternatively or additionally be integrated in a terminal such as a computer, a smartphone, smart glasses, a smart watch, a tablet, etc. of an operator of the system.

A second aspect of the invention relates to a method for controlling the operation of a system for producing at least one particle foam molding. The method includes the steps:

detecting and/or generating resource information describing the current and/or future consumption of at least one resource, in particular a process fluid or an energy carrier, in a current and/or future operation of at least one first automatic molding machine and/or of at least one further automatic molding machine and/or of at least one functional module of the system, controlling the operation of the at least one first molding machine and/or the at least one further molding machine and/or the at least one functional module of the system on the basis of the detected resource information.

A third aspect of the invention relates to a method for producing at least one particle foam molding from an expandable or expanded particle foam material. The method is characterized in that a system according to the first aspect of the invention is used to carry out the method.

All statements made in connection with the system according to the first aspect apply analogously to the method according to the second aspect of the invention and to the method according to the third aspect of the invention.

Figure 1:
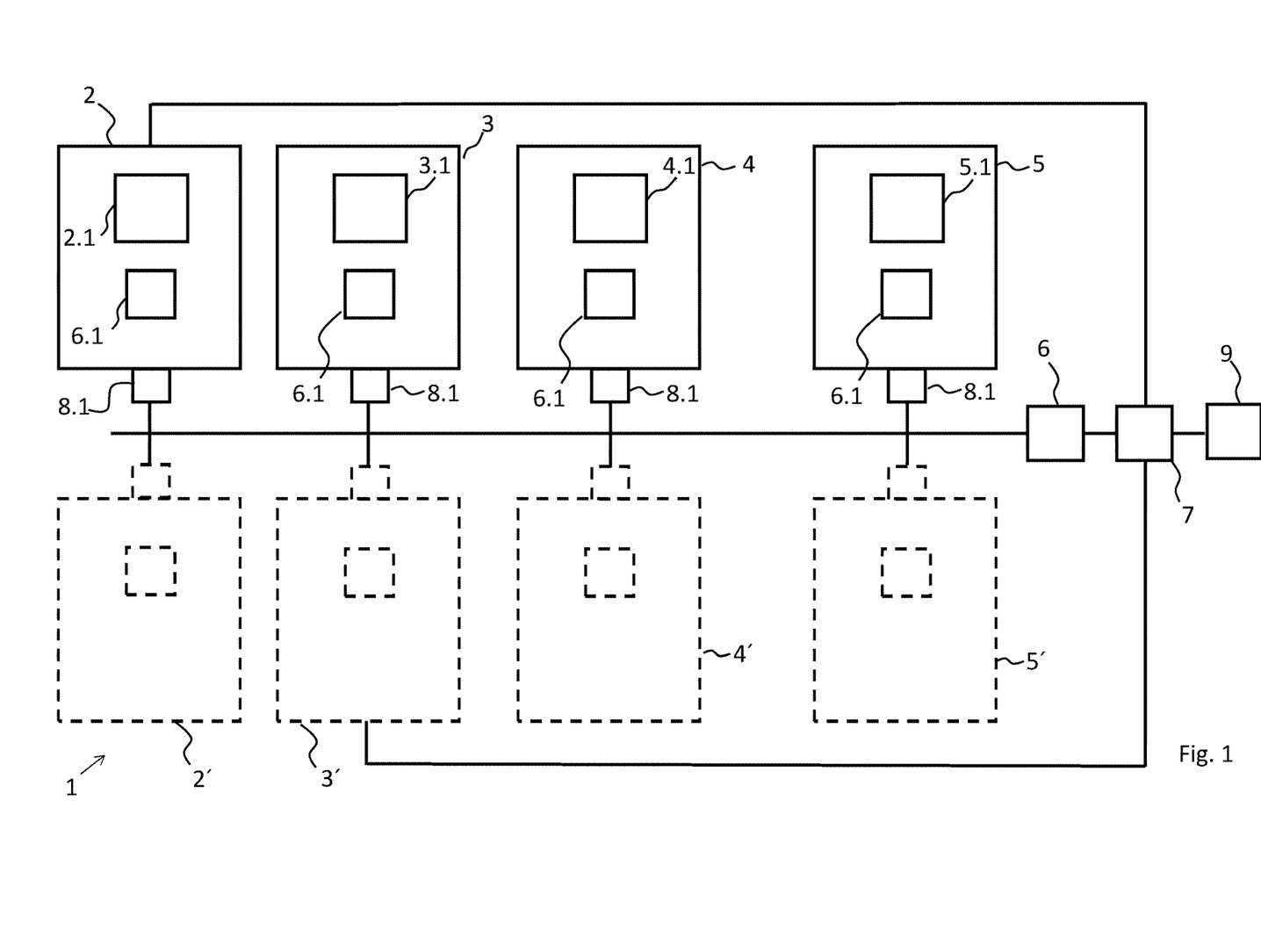
FIG. 1 is a schematic diagram of a system for producing a particle foam molding according to an embodiment.

The invention is explained in more detail using exemplary embodiments in the drawings. The drawings show in:

FIG. 1 shows a schematic diagram of a system 1 for producing a particle foam molding according to an exemplary embodiment.

The system 1 is configured for processing plastic particles from at least one expandable or expanded particle foam material, i.e. e.g. plastic particles made of expandable or expanded polyolefins, expandable or expanded polystyrenes, etc., for the production of particle foam moldings or particle foam components and for this purpose comprises means for carrying out one or more work processes for processing corresponding plastic particles to produce a particle foam molding.

The term "work process" basically includes any process that can be carried out by means of the system 1, which is directly or indirectly related to the processing of plastic particles from at least one expandable or expanded particle foam material for the production of a particle foam molding.

The system 1 comprises several molding machines 2-4. Specifically, in the exemplary embodiment shown in FIG. 1, three molding machines 2-4 are shown purely by way of example.

Each of the molding machines 2-4 is configured to carry out one or more processing steps for processing plastic particles from at least one particle foam material to produce a particle foam molding. The automatic molding machine 2 can therefore also be referred to or considered as a device for processing plastic particles made from at least one expandable or expanded particle foam material. Each molding machine 2-4 includes a mold device 2.1-4.1 for processing plastic particles from at least one expandable or expanded particle foam material to produce a particle foam molding or molded part. Each mold device 2.1-4.1 comprises a mold cavity (also not shown in detail) that can be defined or is defined by one or more mold elements or mold halves (not shown in detail), within which plastic particles made of at least one expandable or expanded particle foam material can be processed to form corresponding particle foam moldings. Each molding machine 2-4 can have an e.g. housing-, rack- or frame-like structure (not designated), on or in which at least the respective mold device 2.1-4.1 is arranged or formed.

The system 1 further comprises at least one functional module 5. The functional module 5 is configured to carry out one or more work processes for processing plastic particles from at least one particle foam material to produce a particle foam molding. Depending on its specific functionality, the functional module 5 comprises at least one functional unit 5.1, which is configured to carry out one or more work processes for processing plastic particles from at least one particle foam material to produce a particle foam molding. A corresponding work process can be e.g. a provision process, a conveying process, a filling process, or a preparation process. The functional module 5 can have a e.g. housing-, rack- or frame-like structure (not designated), on or in which the at least one functional unit 5.1 is arranged or formed.

The functional module 5 can specifically, for example, be formed as a provision device for providing at least one resource, such as e.g. a process fluid or energy source for the at least one molding machine 2-4 and/or for at least one further functional module, or comprise such a device. The term "provision" can include the generation or storage of a resource. A resource in the form of an energy carrier can in particular be an electrical energy carrier, such as e.g. B. current or voltage, and/or a pneumatic energy carrier such as pressure, and/or a thermal energy carrier, such as. heat. A resource in the form of a process fluid can be e.g. be steam, compressed air and/or water.

Another specific embodiment of a corresponding functional module 5 can e.g. be a storage device for temporary storage and, where appropriate, provision of a resource such as a process fluid or an energy source. A specific embodiment of a corresponding functional module 5 can e.g. be a storage device for storing a process fluid such as a steam storage, a compressed air storage or a water storage, or a storage device for storing an energy source such as a power storage, a pressure storage, a heat storage.

Alternatively or additionally, the functional module 5 can be configured as a provision device for providing an expandable or expanded particle foam material or corresponding plastic particles that can be processed or to be processed via at least one automatic molding machine 2-4 or can comprise such a device. A specific embodiment of the functional module 5 can, e.g. be a conveying device for conveying an expandable or expanded particle foam material or corresponding plastic particles that can be processed or to be processed via at least one automatic molding machine 2-4 into at least one mold cavity of at least one automatic molding machine 2-4.

Alternatively or additionally, the functional module 5 can be configured as a treatment device for the treatment of a process fluid of at least one automatic molding machine 2-4 and/or at least one further functional module or can comprise such a device. The term "treatment" can include the change in at least one chemical and/or physical parameter of the respective process fluid.

The boxes shown in dashed lines in FIG. 1 indicate schematically that the system 1 can also comprise further molding machines 2'-4' and/or functional modules 5'. In principle, any configurations of corresponding molding machines and/or functional modules are possible.

Both the respective automatic molding machines 2-4 and the functional module 5 can have interfaces (not shown) for, in particular functional and/or constructive, coupling to the at least one further automatic molding machine 2-4 and/or at least one additional functional module. Corresponding interfaces can accordingly be functional and/or constructive interfaces. Appropriate interfaces can therefore be configured to produce an individual functional and/or constructive coupling of automatic molding machines 2-4 and/or functional modules 5, 5'. In particular, the interfaces enable direct coupling of molding machines 2-4 and/or functional modules to or with each other, in particular in such a way that the respective molding machine-side or function-module-side structures or housing structures can be directly connected or coupled to one another or coupled.

Within the scope of the operation of the system 1, resources are consumed. Resources are in particular process fluids such as steam and/or compressed air and/or water, and/or energy carriers required for the operation of the first molding machine and/or the at least one further molding machine and/or the at least one functional module, such as electrical, pneumatic and/or thermal energy sources.

The system 1 also includes a detection device 6 implemented in terms of hardware and/or software. The detection device 6 is configured to detect resource information describing the current and/or future consumption of at least one resource, i.e. in particular a process fluid or an energy source, in a current and/or future operation of individual, several or all molding machines 2-4 and/or individual, several or all functional modules 5. An indication or knowledge in the form of an item of resource information can thus be generated by the detection device 6 about the current or future consumption of one or more within the scope of the operation of the system 1 or at least one component of the system 1, i.e. e.g. of the molding machines 2-4 and the functional module 5.

In the exemplary embodiment, the detection device 6 comprises a plurality of detection elements 6.1, i.e. e.g. sensor elements, consumption meter elements, etc., the detection information of which can be processed into a corresponding resource information by the detection device 6, i.e. in particular corresponding processing algorithms of the detection device 6. Based on the exemplary embodiment according to FIG. 1, it can be seen that the components of the system 1 can each be assigned at least one corresponding detection element 6.1, via which resource(s) or one or more items of detection information describing the current and/or future consumption of one or more resources or resources required for the operation of the respective component can be determined (consumption detection information) in the context of the operation of the respective component, on the basis of which the detection device 6 generates the resource information.

In order to generate corresponding resource information, the detection device 6 can in principle use any information—this can, as mentioned, e.g. be provided from a detection element 6.1 assignable or assigned to a molding machine 2-4 and/or a functional module 5—via which the consumption of one or more resources in a current and/or future operation of the system 1 can be described. In principle, e.g. current consumption values of one, several or all resources used in the operation of the system 1 and/or, e.g. from an operational plan of the system 1, future consumption values of one, several or all resources consumed in the operation of the system 1 are taken into account and processed accordingly to form resource information.

The detection device 6 can be configured to generate specific resource information for certain resources, i.e. resource information describing the current and/or future consumption of one or more specific resources. Specific resource information can e.g. be generated for certain process fluids and/or certain energy carriers. A specific example is therefore resource information which describes the current and/or future consumption of steam or compressed air or water as respective examples of specific process fluids. A further specific example is resource information which describes the current and/or future consumption of electrical, pneumatic or thermal energy as respective examples of specific energy carriers.

Alternatively, the detection device 6 can be configured to generate specific resource information for certain components of the system 1, i.e. resource information describing the current and/or future consumption of one or more specific components of the system 1. Specific resource information can e.g. be generated for certain molding machines 2-4 and/or certain functional modules 5. A specific example is therefore resource information which shows the current and/or future consumption of a resource for at least one specific molding machine 2-4 or a group of specific molding machines 2-4, in particular a group of identically or similarly configured molding machines 2-4. A further specific example is resource information which describes the current and/or future consumption of a resource for at least one specific functional module 5 or a group of specific functional modules 5, in particular a group of functional modules 5 configured in the same or similar manner.

Of course, resource information can also describe both specific resource information for specific resources and specific resource information for specific components of the system 1. Consequently, very detailed information about the current and/or future resource consumption within the system 1 can be described via corresponding resource information.

Via corresponding resource information, if necessary spatially and/or temporally resolved, qualitative or quantitative knowledge about the current and/or future consumption of one or more resources required for the operation of the system 1 or corresponding components of the system 1, such as molding machines 2-4 and/or functional modules 5, 5' or resources consumed in the operation of the system 1 can be obtained, on which can be based the control of the operation of the system 1, for example with regard to the most efficient use of corresponding resources.

Consequently, corresponding resource information can preventively determine resource consumption of the system 1 or individual functional modules 5, 5' of the system 1, which enables efficient control of the system 1 e.g. with regard to the mentioned use of corresponding resources, but also, for example, with regard to reducing dead times of certain functional modules 5, 5'.

For example, a current or future resource consumption required for the operation of at least one first automatic molding machine 2-4 and/or at least one first functional module 5, 5' within the system 1 can be transmitted to at least one further automatic molding machine 2-4 and/or to at least one additional functional module 5, 5' so that the resource required for the operation of the at least one first molding machine 2-4 and/or the at least one first functional module 5, 5' can be provided in good time via the at least one further molding machine 2-4 and/or via the at least one further functional module 5, 5'.

In particular, e.g. a current or future resource consumption—this is to be understood in principle as a resource requirement—for the operation of a molding machine 2-4, i.e. e.g. a supply medium, such as superheated steam, can be transmitted within the system 1 to a steam generator as an example of a functional module 5, 5', so that the steam generator generates or provides the quantity of the process fluid having the desired properties and required for the operation of the molding machines 2-4, such as a desired pressure, a desired temperature, etc.

The detection device 6 can be configured to generate corresponding resource information continuously, quasi-continuously or discontinuously.

In principle, it is possible for only the respective detection elements 6.1 to form the or a corresponding detection device of the system 1, so that, contrary to the exemplary representation according to FIG. 1, no separate detection device has to be present. Rather, a non-hierarchical intelligence can be realized through respective detection elements 6.1, a network-like or swarm-like distributed arrangement of corresponding detection elements 6.1.

The system 1 also includes a control device 7 implemented in terms of hardware and/or software. The control device 7—which can be a central control station of the system 1—is configured to control the operation of the system 1, i.e. in particular the molding machines 2-4 and/or the functional module 5, on the basis of corresponding resource information. Controlling the operation of the system 1 can also influence the consumption of one, several or all of the resources used in current and/or future operation of the system. In this way, optimized operation of the system 1 e.g. with regard to a target criterion, such as the consumption of resources, can be realized.

The control device 6 communicating with the components of the system 1 via data connections indicated purely schematically can use current consumption values, etc. of individual, several or all components of the system 1 as a basis for an optimized control of the operation of the system 1 in the sense of a hub. Appropriate control of the operation of the system 1 can of course also have a positive effect on the quality of the particle foam moldings that can be produced or are produced by means of the system 1, or on their reproducibility.

Through the interaction of the detection device 6 and the control device 7 and thus through the possibility of using appropriate resource information as a basis for the targeted control of the operation of the system 1, i.e. in particular controlling the operation of system 1 or certain components of the system 1 depending on corresponding resource information, there is a possibility to control the operation of the system 1 with regard to an efficient use of resources. This also includes the possibility of controlling and, if necessary, also optimizing consumption for resources, particle foam materials, etc. with regard to a current and/or future operating situation of the system 1 or individual, several or all components of the system 1, and/or of compensating functional failures or restrictions of certain components of system 1.

The detection device 6 can be configured to detect current and/or future items of operating information of individual, several or all components of the system 1 as an alternative or in addition to corresponding resource information, and to generate operating information describing the current and/or future operation of individual, several or all components of the system 1. Via corresponding operating information, current and/or future processing processes carried out by the respective components of the system 1 can e.g. be detected.

The detection device 6 can also be configured to detect current and/or future status information of individual, several or all components of the system 1 as an alternative or in addition to corresponding resource information, and to generate status information describing the current and/or future status of individual, several or all components of the system 1. Via a corresponding status information, current and/or future service or repair work to be carried out on the respective components of the system 1 or associated functional units such as molds can be detected in the sense of "predictive maintenance".

The control device 7 can be configured to process resource information using artificial intelligence or machine learning in order to implement a self-optimizing system. In this way, a proactive "behavior" of system 1 can e.g. be realized as part of planning the operation of the system 1.

As mentioned, the control device 7 can be configured to base the control of the operation of the molding machines 2-4 and/or the functional module 5 on at least one target criterion. The control device 7 can therefore be configured to control the operation of the system 1 on the basis of corresponding resource information, but taking into account at least one target criterion. A corresponding target criterion can e.g. be defined on the part of the operator of the system 1 or, where appropriate, in an automated or automatic manner, by a hardware and/or implemented in terms of software. A corresponding device can include means of artificial intelligence and/or machine learning, possibly correspondingly "trained".

A corresponding target criterion can e.g. define a certain energy consumption, in particular a minimum or a maximum energy consumption, of the system or at least a certain part of the system. The control device 7 can therefore be configured to control the operation of the system 1 or at least one specific component of the system 1 on the basis of corresponding resource information, but taking into account at least one target criterion that defines a specific energy consumption of the system or at least one specific component of the system 1.

Alternatively or additionally, a corresponding target criterion can define a specific process fluid consumption, in particular a minimum or a maximum process fluid consumption, of the system 1 or at least of a specific component of the system 1. The control device 7 can therefore be configured to control the operation of the system 1 or at least one specific component of the system 1 on the basis of corresponding resource information, but taking into account at least one target criterion that defines a specific process fluid consumption of the system 1 or at least one specific component of the system 1.

Alternatively or additionally, a corresponding target criterion can define a specific efficiency, in particular a minimum or maximum efficiency, of the system 1 or at least of a specific component of the system 1. The control device can therefore be configured to control the operation of the system 1 or at least one specific component of the system 1 on the basis of corresponding resource information, but taking into account at least one target criterion that defines a specific efficiency of the system 1 or at least one specific component of the system 1.

Alternatively or additionally, a corresponding target criterion can define a specific productivity, in particular a minimum or maximum productivity, of the system 1 or at least of a specific component of the system 1. The control device 7 can therefore be configured to control the operation of the system 1 or at least one specific component of the system 1 on the basis of corresponding resource information, but taking into account at least one target criterion that defines a specific productivity of the system 1 or at least one specific component of the system 1.

The control device 7 can be configured to control at least one operating parameter, in particular a power or power consumption, of at least one molding machine 2-4 and/or the functional module 5 on the basis of the (item of) resource information. Controlling at least one operating parameter of at least one molding machine 2-4 and/or the functional module 5 is an expedient possibility of controlling the operation of the system 1 with regard to a target criterion. In particular, a coordinated, i.e. in particular time-staggered, power consumption of the molding machine and/or the functional module 5 is possible. In this way, peak load situations of certain components of the system 1 or of the entire system 1 can be coordinated in terms of control technology and thus in particular also be avoided.

Alternatively or additionally, the control device 7 can be used to control at least one start time and/or one end time of the operation of at least the molding machines 2-4 and/or the functional module 5. Controlling a start time and/or an end time of the operation of one or more molding machines 2-4 and/or one or more functional modules 5 also represents an expedient possibility of controlling the operation of the system 1 with regard to a target criterion. In particular, a coordinated, i.e. in particular staggered determination of start times and/or end times of the operation of at least one molding machine 2-4 and/or at least one functional module 5 is possible. In this way, peak load situations of certain components of the system 1 or of the entire system 1 can also be coordinated in terms of control technology and thus in particular also be avoided.

Alternatively or additionally, the control device 7 can be configured to control at least a start time and/or an end time of at least one specific work process of at least one molding machine 2-4 and/or at least one functional module 5 based on the resource information. Controlling a start time and/or an end time of a work process of at least one molding machine 2-4 and/or at least one functional module 5 also represents an expedient possibility of controlling the operation of the system 1 with regard to a target criterion. In particular, a coordinated, i.e. in particular staggered determination of start times and/or end times of work processes of at least one molding machine 2-4 and/or at least one functional module 5 is possible. In this way, peak load situations of certain components of the system 1 or of the entire system 1 can also be coordinated in terms of control technology and thus in particular also avoided.

The control device 7 can also be configured to distribute, on the basis of resource information, resources, i.e. in particular process fluids, further in particular preconditioned process fluids, within system 1, i.e. in particular among the corresponding automatic molding machines 2-4 and/or functional modules 5 of the system 1. In this way, peak consumption situations in certain components of the system 1 can be coordinated in terms of control technology and thus, in particular, also be avoided.

The control device 7 can be configured in particular to control the distribution of resources such as energy carriers and/or process fluids within the system 1, taking into account at least one target criterion. A corresponding target criterion can e.g. be defined on the part of the operator of the system 1 or, where appropriate, be defined in an automated manner or be defined by a device implemented in terms of hardware and/or software. A corresponding device may include means of artificial intelligence and/or machine learning, possibly correspondingly "trained".

A corresponding target criterion can define an even or uneven distribution of resources within the system 1. A corresponding even or uneven distribution of resources within the system 1 can typically also influence the consumption of resources during the operation of the system 1, so that a corresponding even or uneven distribution of resources within the system 1 also results in a means of at least temporary even or uneven consumption of resources within the system 1. Specifically, such situations can be avoided in which certain components of the system 1, e.g. in view of their given capacity, too few resources, i.e. e.g. too little process fluid, too little plastic particles, etc. and/or certain components of the system 1, e.g. in view of their given capacity, too many resources, i.e. too much process fluid, too much plastic particles, etc., can be avoided, so that an overall efficient distribution of resources within the system 1 is possible.

The control device 7 can also be configured to compare (items of) resource information with (items of) reference resource information and to generate (items of) comparison information describing a corresponding comparison result. In this case, the control device 7 can be configured to evaluate corresponding comparative information or a corresponding comparative result with regard to at least one evaluation criterion, for example in order to identify current and/or future deviations from corresponding reference resource information.

The control device 7 can also be configured to control a measure to compensate for a deviation, in particular outside a predefinable or predefined limit value, between a resource information and a reference resource information. A corresponding measure can e.g. be an active measure to change the current and/or future consumption of resources, for example by a targeted temporary decommissioning or commissioning of certain components of the system 1.

The system 1 can include the data transmission device 8 already indicated, which is configured to transmit one or more pieces of resource information to the control device 7. The data transmission device 8 can be configured for this purpose, specific local or global wired or wireless data transmission protocols such as LAN or WLAN protocols to implement in order to transmit appropriate resource information to the control device 7.

The data transmission device 8 comprises a plurality of data transmission elements 8.1 communicating with the control device 8. In particular, as shown by way of example in FIG. 1, it is possible for at least one data transmission element to be assigned to each component of the system 1, so that data can be transmitted from each component of the system 1 to the control device 7, in particular for being processed there. The data transmission device 8 can therefore be a data transmission or communication network or include such network, via which, in particular in real time, data, i.e. in particular resource information, in particular for being processed there, can be transmitted to the control device 7.

In all of the embodiments, the system 1 can also include at least one output device 9 for outputting corresponding resource information. Corresponding resource information can be displayed to an operator of the system 1, e.g. in the form of an alphanumeric and/or graphical representation, via the output device 9, which is e.g. configured as a display device or includes such a device, so that the operator can get an overview of the current and/or future consumption of at least one resource in a current and/or future operation of the system 1. Of course, a corresponding output device 9 can alternatively or additionally be integrated in a terminal such as a computer, a smartphone, smart glasses, a smart watch, a tablet, etc., an operator of the system 1.

Figure 2:
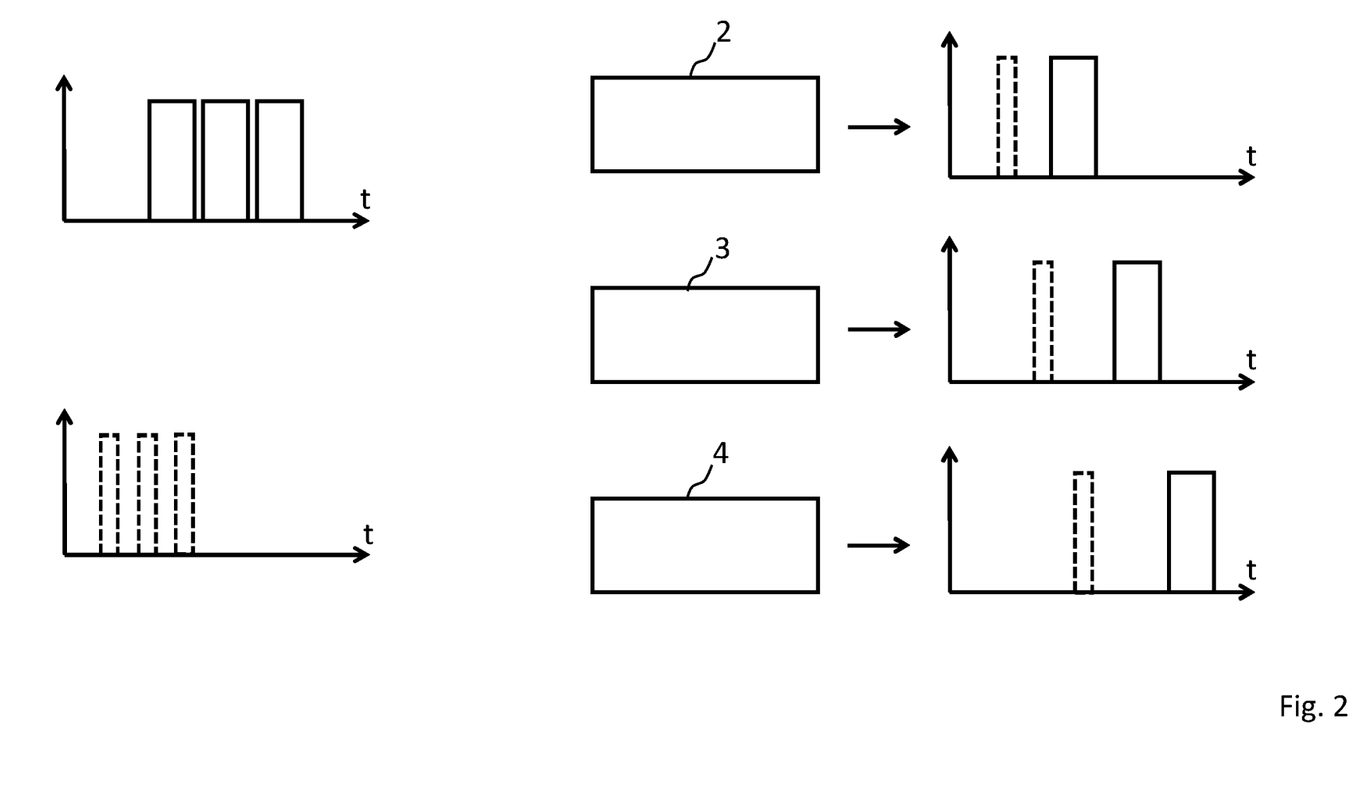
FIG. 2 is a schematic diagram of a system for producing a particle foam molding according to a further embodiment.

FIG. 2 shows a schematic diagram of a system 1 for producing a particle foam molding according to a further exemplary embodiment.

The exemplary embodiment shown in FIG. 2 will be used to explain how the control device 7 may control the operation of the molding machines 2-4—the same applies to the functional modules 5—in a coordinated manner in order to coordinate peak load situations of certain components of the system 1 or the entire system 1 in terms of control technology, and thus in particular also to avoid them.

The two diagrams on the left in FIG. 2 represent the time demands for a process fluid (upper diagram) and for an energy carrier shown in dashed lines (lower diagram) for an exemplary operating situation of system 1. As can be seen, these are staggered so that peak load situations cannot occur.

The control device 7 controls the operation of the molding machines 2-4 here—as the three diagrams on the right show—equally so that the process fluids and the energy sources are coordinated, i.e. staggered over time, so that peak load situations cannot occur.

With the system 1 according to the exemplary embodiments shown in the figures, a method for controlling the operation of a system 1 for producing at least one particle foam molding can be used. The method includes the steps:
- detecting and/or generating resource information describing the current and/or future consumption of at least one resource, in particular a process fluid or an energy carrier, in a current and/or future operation of at least one first molding machine 2-4 and/or at least one functional module 5 of the system 1,
- controlling the operation of at least one automatic molding machine 2-4 and/or at least one functional module 5 of the system 1 on the basis of the detected resource information.

With the systems 1 according to the exemplary embodiments shown in the figures, a method for producing at least one particle foam molding from an expandable or expanded particle foam material can also be implemented.

The invention claimed is:

1. A system for producing at least one particle foam molding from an expandable or expanded particle foam material, comprising:
   - a first molding machine for carrying out at least one work process for producing at least one particle foam molding from an expandable or expanded particle foam material, wherein the first molding machine comprises at least one mold device for processing expandable or expanded particle foam material for producing a particle foam molding;
   - at least one further automatic molding machine for carrying out at least one work process for producing at least one particle foam molding from an expandable or expanded particle foam material, wherein the at least one further automatic molding machine comprises at least one mold device for processing expandable or expanded particle foam material for producing a particle foam molding, and/or
   - at least one functional module that can be assigned to the first molding machine and/or to the at least one further molding machine for carrying out at least one work process for producing at least one particle foam molding from an expandable or expanded particle foam material;
   - a detection device which is configured to detect at least one item of resource information describing the current and/or future consumption of at least one resource, in particular a process fluid or an energy carrier, in a current and/or future operation of the first molding machine and/or of the at least one further molding machine and/or of the at least one functional module,
   - a control device which is configured to control the operation of at least two of: the first molding machine and/or the at least one further molding machine and/or the at least one functional module on the basis of an item of resource information detected by the detection device;
   - wherein the control device is configured to control at least a starting point in time and/or an end point in time for the operation of the first molding machine and/or of the at least one further molding machine and/or of the at least one functional module on basis of the resource information, and wherein the control device coordinates power consumption of the first automatic molding machine and/or the at least one further automatic molding machine and/or the at least one functional module to coordinate or avoid peak load situations of certain components of the system or of the entire system.

2. The system according to claim 1, wherein the control device is configured to control the operation of the first molding machine and/or of the at least one further molding machine and/or of the at least one functional module on the basis of at least one target criterion.

3. The system according to claim 2, wherein the target criterion defines a certain energy consumption of the system, in particular a minimum or a maximum energy consumption, and/or
   - the or a target criterion defines a certain process fluid consumption of the system, in particular a minimum or a maximum process fluid consumption, and/or
   - the or a target criterion defines a certain efficiency of the system, in particular a minimum or a maximum efficiency; and/or
   - the or a target criterion defines a certain productivity of the system, in particular a minimum or a maximum productivity.

4. The system according to claim 1, further comprising a data transmission device which is configured to transmit one or more items of resource information to the control device.

5. The system according to claim 1, wherein the control device is configured, on the basis of resource information, to distribute resources within the system, in particular among corresponding automatic molding machines and/or functional modules of the system.

6. The system according to claim 5, wherein the control device is configured to base the distribution of the resources on at least one target criterion.

7. The system according to claim 6, wherein the target criterion defines an even or uneven distribution of resources within the system.

8. The system according to claim 1, wherein the control device is configured to compare an item of resource information with an item of reference resource information and to generate an item of comparison information describing a corresponding comparison result.

9. The system according to claim 8, wherein the control device is configured to control at least one measure for compensation of a deviation, in particular outside a predefinable or predefined limit value, between the detected resource information and reference resource information.

10. The system according to claim 1, further comprising an output device (9) for outputting an item of resource information.

11. The system according to claim 1, wherein the at least one functional module is a provision device for providing at least one process fluid.

12. The system according to claim 1, wherein the at least one functional module is configured as a provision device for providing an expandable or expanded particle foam material that can be processed or is to be processed via the at least one automatic molding machine, or comprises such a device.

13. The system according to claim 1, wherein the at least one functional module is configured as a processing device for processing a supply medium of the at least one molding machine and/or of at least one further functional module, or comprises such a device.

14. The system according to claim 1, wherein the resource is a process fluid, in particular steam and/or compressed air and/or water and/or an energy carrier, in particular an electrical energy carrier.

\* \* \* \* \*